No. 762,309. PATENTED JUNE 14, 1904.
G. M. HOFFMAN & J. T. GIBSON.
APPARATUS FOR WASHING GRANULAR MATERIALS.
APPLICATION FILED MAY 9, 1902.
NO MODEL. 3 SHEETS—SHEET 1.
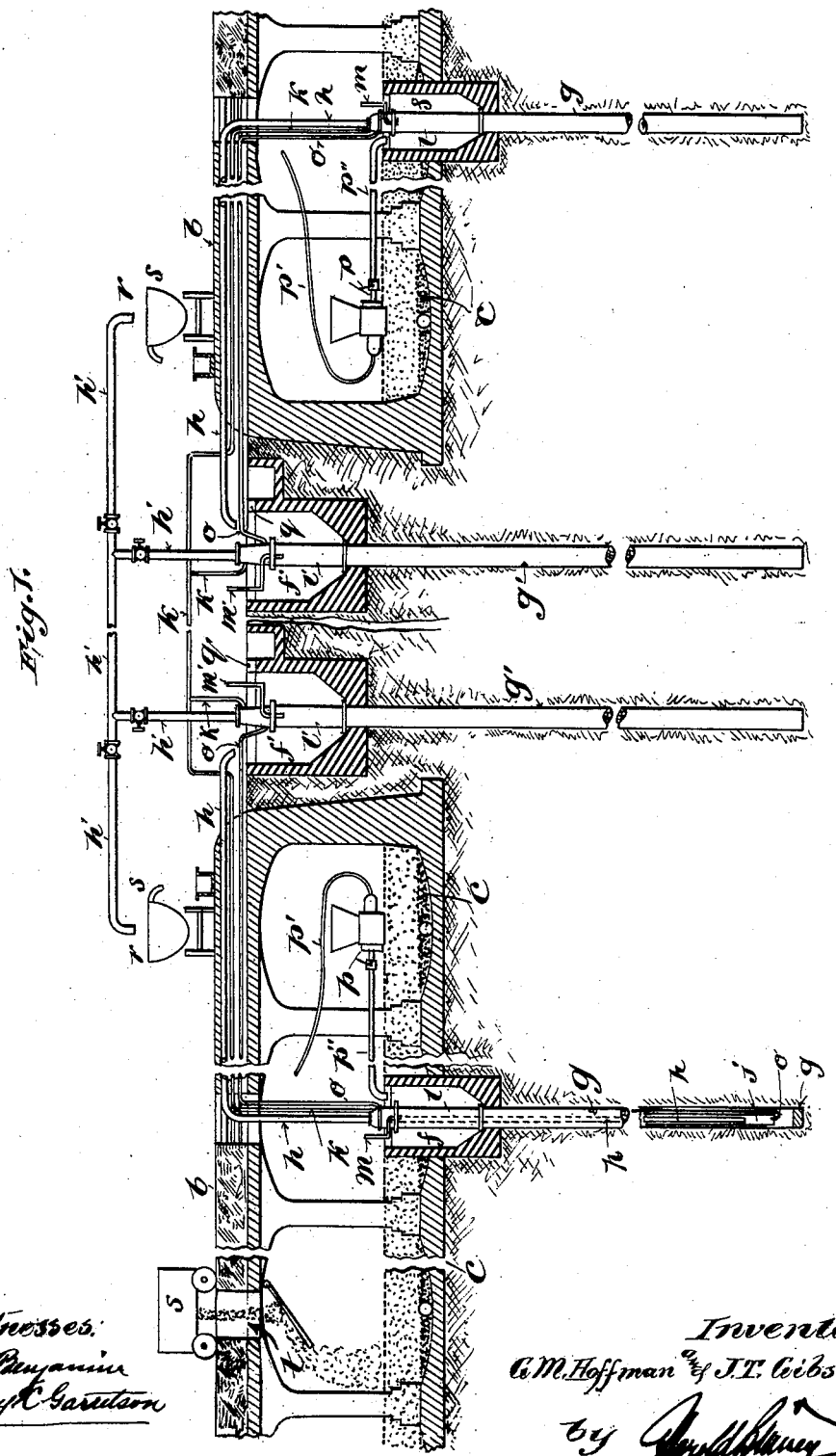

No. 762,309. PATENTED JUNE 14, 1904.
G. M. HOFFMAN & J. T. GIBSON.
APPARATUS FOR WASHING GRANULAR MATERIALS.
APPLICATION FILED MAY 9, 1902.
NO MODEL. 3 SHEETS—SHEET 2.
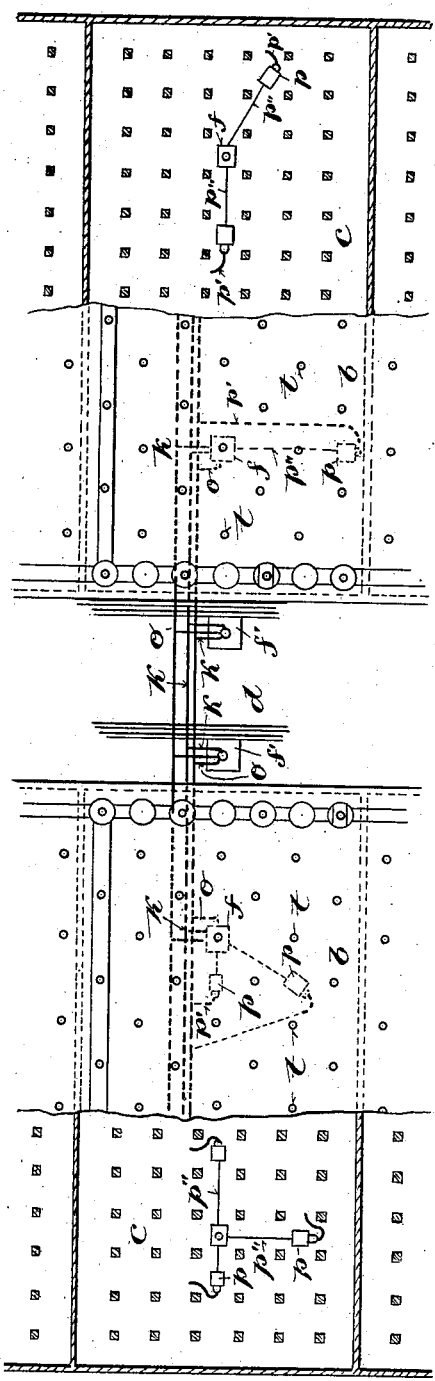
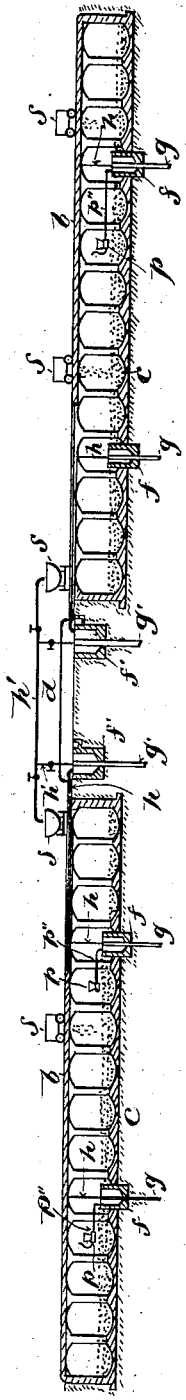
Witnesses. Inventors.
G. M. Hoffman & J. T. Gibson.
by
atty No. 762,309. PATENTED JUNE 14, 1904.
G. M. HOFFMAN & J. T. GIBSON.
APPARATUS FOR WASHING GRANULAR MATERIALS.
APPLICATION FILED MAY 9, 1902.
NO MODEL. 3 SHEETS—SHEET 3.
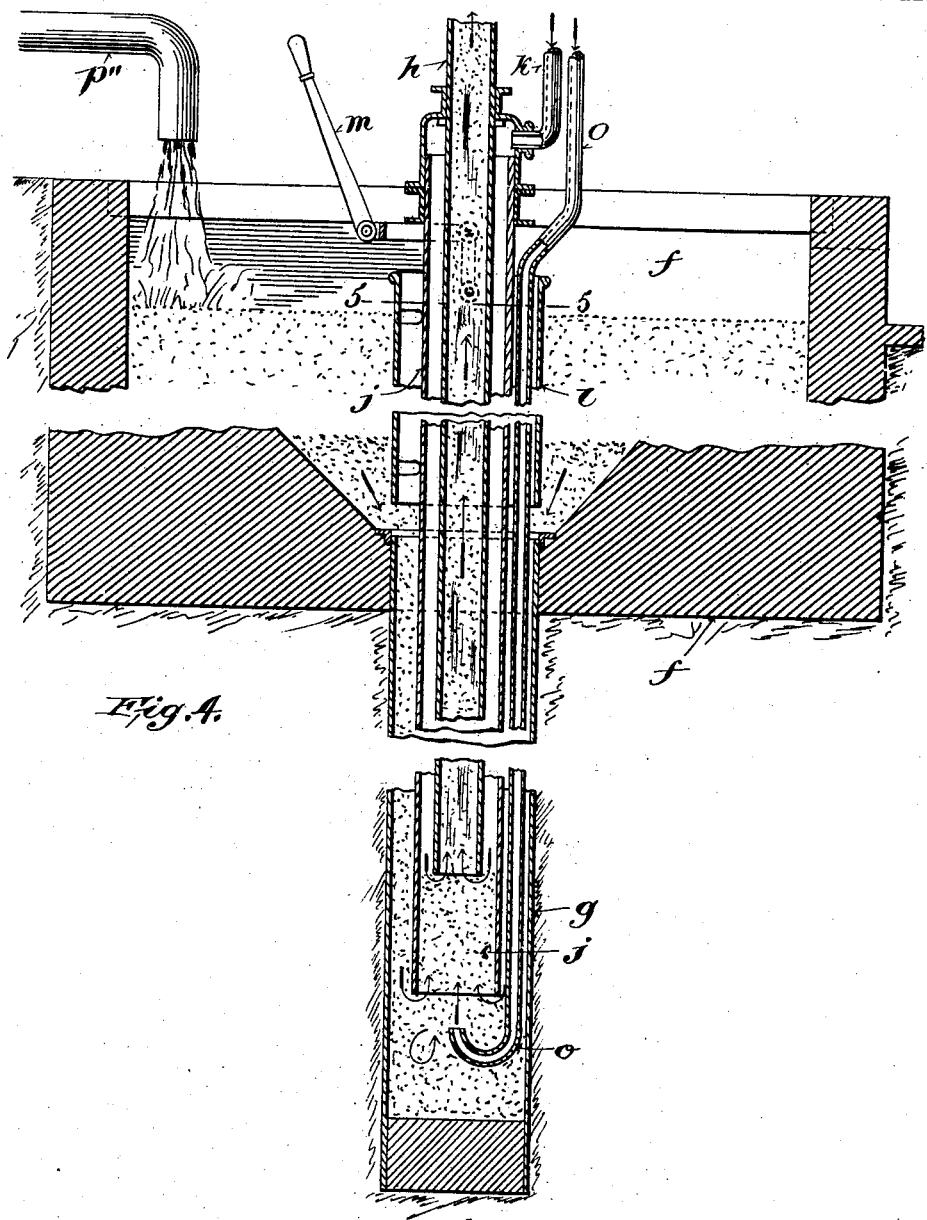

No. 762,309. Patented June 14, 1904.

UNITED STATES PATENT OFFICE.

GEORGE M. HOFFMAN, OF THE UNITED STATES ARMY, AND JOHN T. GIBSON, OF NEW YORK, N. Y.

APPARATUS FOR WASHING GRANULAR MATERIALS.

SPECIFICATION forming part of Letters Patent No. 762,309, dated June 14, 1904.

Application filed May 9, 1902. Serial No. 106,659. (No model.)

*To all whom it may concern:*

Be it known that we, GEORGE M. HOFFMAN, of the United States Army, now residing at Washington, in the District of Columbia, and JOHN TREVOR GIBSON, of the city and State of New York, have invented certain new and useful Improvements in Apparatus for Washing Granular Materials, of which the following is a specification illustrated by accompanying drawings.

The invention is especially designed and adapted for the washing of sand used in filtration beds. Its object is to accomplish at once a more thorough washing of the sand than is now conveniently possible and at the same time to save labor and handling of the material in transporting it from the bed to the storage areas or other filter-beds. The invention is not, however, limited to such a use.

The process of transporting and washing granular materials, which may be used in conjunction with the apparatus herein described, is set forth in our application filed November 19, 1901, Serial No. 82,883.

We have discovered that the apparatus for raising water known as an "air-lift," wherein the hydrostatic column of water in which the lower end of the air-lift is immersed acts to force upward the lighter hydrostatic column of water and air mixed, produces a whirling or vortex motion of the water in the uptake-passage and that the air-bubbles contained in the water produce upon sand or granular materials a stirring or agitating effect by which they are readily cleansed. As such an air-lift serves, moreover, as a most excellent means for raising granular materials under suspension in water or other liquid without having the objections that are present in a pump or other valved hydraulic apparatus the user of the present improvement is enabled to simultaneously accomplish three different and distinct results, first, the mechanical attrition produced in the apparatus; secondly, the thorough aeration of the water or liquid in which the granular material is suspended, and, thirdly, the agitating and additional stirring of the granular particles by the bubbles of air, which are always tending to rise through the suspending liquid.

In the drawings the invention is shown as applied to water-filtration beds.

Figure 1 is a sectional diagrammatic view on a very small scale, showing the filter-beds on each side of a central court with the air-lift apparatus in a state of rest. Fig. 2 is a greatly-reduced diagrammatic plan view with the roof of the filter-bed removed at the end of the bed remote from the central court. Fig. 3 is a vertical section of the same. Fig. 4 is a vertical section of one of the washing pits or wells. Fig. 5 is a cross-section of Fig. 4 on the plane 5 5.

Let $b$ be the roofs of the filter-beds, $c$ the beds, and $d$ the central courtyard. At convenient intervals in each filter-bed are placed hopper-shaped receptacles $f$, forming the mouths of immersion wells or pits $g$. From a point well above the closed bottom of the immersion pit or well $g$ extends the uptake-pipe $h$, which preferably rises to the roof of the filter-bed and delivers the mixed sand, water, and air at any desired part—as, for example, into a second washing apparatus hopper $f'$ in the courtyard. Surrounding the uptake $h$ is the downtake air-pipe $j$, the details of which will be understood by those familiar with air-lifts. If the depth of immersion of the uptake $h$ in the well is equal to or greater than the height to which the water and sand are to be raised above the mouth of the well, the apparatus will do good work.

Compressed air is supplied through the pipe $k$ and down the air-pipe $j$ under sufficient pressure to pass into the foot of the uptake-pipe $h$, and the air so supplied to the uptake will lighten the column in the uptake until the hydraulic pressure produced by the column of water in the well $g$ causes the raising and delivery of the sand through the uptake-pipe.

In order to prevent the filling up and clogging of the well with the sand when the apparatus is at rest, an immersion-well-closing valve $l$ is provided adjustable vertically upon the well by means of a lever $m$ and suitable connections. When the valve $l$ is down, it closes the immersion pit or well and prevents the sand pouring into it through the mouth or hopper $f$. When the valve $l$ is of tubular form and open at the top, as shown, it provides a ready means for completely washing out the well, if desired, by introducing clear water without sand through the annular space within the valve without necessitating cleaning out the entire hopper $f$.

A water-jet pipe $o$, preferably directed upward toward the foot of the uptake-pipe $h$, is provided in a position to stir up and loosen any sand that may have settled beneath the uptake-pipe. Such a jet may also be used to introduce a jet of water for the purpose of not only diluting and stirring the commingled water and sand, but also of forcing them upward into and through the uptake-pipe. The sand in the filter-bed might of course be shoveled up and carried by hand to the hopper $f$, but preferably some form of hydraulic apparatus is used, as at $p$. This accomplishes at once a saving of labor and the introduction of water with the sand into the hopper $f$. In any event the sand is introduced with water into the hopper $f$, and the valve $l$ being open and the air-lift started the commingled sand and water are drawn into it and pass down the well $g$. In so drawing the water from the hopper $f$ into the well $g$ a whirling or vortex is generally produced, just as may be readily observed in a wash-basin when the water runs out freely through the trap. The dirty sand mixed with water is therefore violently stirred and agitated and passes down the well and into the uptake-pipe, where it is mixed with the air, which rushing into the uptake-pipe forms bubbles or masses of air, which strive to rise through the water and tend to break up and separate any particles of sand which may remain clinging together, and at the same time are of course the operative cause of the rushing of the commingled air, water, and sand through the uptake-pipe $h$ to the point of delivery. Preferably the water and sand from the pipe $h$ are introduced into a second hopper $f'$, which is provided with an overflow or weir, as at $q$. In the hopper $f'$ a partial triple separation takes place. The air almost entirely escapes the surface of the water. The dirty water carrying nearly all the dirt from the sand flows over the weir $q$ and runs to waste. The sand descends to the bottom of the hopper and enters the immersion well or pit $g'$. This second washing or rinsing well $g'$ and the air-lift apparatus within it and its valve $l'$ may be of the same construction in all respects as the first well that has just been described; but fresh water, preferably clean filtered water, should be introduced to rinse the sand, and in order to better prevent the fresh water from mixing with the dirty water to any great degree the fresh water is introduced through the top of the annular valve $l'$, and this valve being raised the fresh water runs down inside it and meets the sand as the sand passes into the well $g'$ with comparatively little dirty water. The uptake $h$ of this rinsing-well is preferably connected so as to deliver to either of two points $r$ $r'$, and by suitably arranging railway-tracks tank-cars $s$ may be run beneath the delivery end of the pipe $h'$ and the sand and water delivered until the car is filled with sand, the water being allowed to flow off at the top of the tank-car. The sand so washed is ready to be run to the several openings $t$ in the roof of the filter-bed and there dumped, as seen in Fig. 1, directly onto the filter-bed.

A portion of the system of rails and turntables are diagrammatically indicated in Fig. 2, though this is of course not a portion of the patentable features of the invention, and, being familiar, engineering practice in other relations is not set forth in detail.

Under present conditions it seems preferable to employ manual labor in spreading the sand on the filter-bed; but it will be seen from the foregoing that that is the only manual handling which the sand receives after it is shoveled into the hopper of the hydraulic apparatus $p$. By providing valves at suitable points, as shown, the sand from one filter-bed may be washed and delivered back to the same filter-bed or to the filter-bed opposite or to any other point to which it is thought advisable to extend the pipe $h'$.

Obviously some features of the invention may be used without other features and may be embodied in widely-varying forms. For this reason we claim the following:

1. In combination, an immersion pit or well, a hopper or receptacle which forms an enlarged receiving-mouth for the said pit or well, air-lift apparatus for raising materials from the said well, and an annular valve for closing the top of the said immersion pit or well, said valve being separated by an annular space from the air-lift apparatus around which it is guided, for substantially the purposes set forth.

2. In combination with an immersion pit or well, and a hopper which forms an enlarged receiving-mouth for the said pit or well, of air-lift apparatus for raising materials from the said well, an annular valve located on the air-lift apparatus, and a water-jet pipe extending through the valve into the immersion pit or well, for substantially the purposes set forth.

3. In combination with a filter-bed structure and as a means for washing and transporting filtering material, a hopper extending down into the filter-bed, an immersion pit or well and air-lift mechanism for the said hopper, and an annular valve for closing the top of the said immersion pit or well, for substantially the purposes set forth.

4. In combination with a filter-bed structure and as a means for washing and transporting the filtering material, a hopper extending down into the filter-bed and an immersion-pit and air-lift mechanism for the said hopper, and means for introducing washing-water into the said hopper, for substantially the purposes set forth.

5. In combination with a filter-bed structure and as a means for washing and transporting the filtering material, a hopper adapted to receive the filtering material, an immersion pit or well and air-lift mechanism for the said hopper, and means for forcing sand and water into the said hopper, for substantially the purposes set forth.

6. In combination with a filter-bed structure and as a means for washing and transporting the filtering material, a hopper adapted to receive the filtering material, an immersion pit or well and air-lift mechanism for the said hopper, means for forcing sand and water into the said hopper, a second hopper to which the uptake of the said air-lift apparatus delivers, having an overflow for the water, and an immersion-pit and air-lift apparatus for the said hopper, for substantially the purposes set forth.

7. In combination with a filter-bed structure and as a means for washing and transporting the filtering material, a hopper adapted to receive the filtering material, an immersion pit or well and air-lift mechanism for the said hopper, means for forcing sand and water into the said hopper, a second hopper to which the uptake of the said air-lift apparatus delivers, having an overflow for the water, an immersion-pit and air-lift apparatus for the said hopper, and means for introducing additional rinsing-water into the second said immersion pit or well, for substantially the purposes set forth.

Signed this 13th day of March, 1902.

GEORGE M. HOFFMAN.
JOHN T. GIBSON.

Witnesses as to the signature of George M. Hoffman:

JOSEPH C. STACK,
RAPHAEL C. SMEAD.

Witnesses as to the signature of John T Gibson:

E. VAN ZANDT,
HENRY C. GARRETSON.